(12) United States Patent
Schulz et al.

(10) Patent No.: US 9,642,235 B2
(45) Date of Patent: May 2, 2017

(54) EUV RADIATION GENERATING DEVICE INCLUDING A BEAM INFLUENCING OPTICAL UNIT

(71) Applicant: TRUMPF Lasersystems for Semiconductor Manufacturing GmbH, Ditzingen (DE)

(72) Inventors: Joachim Schulz, Gerlingen (DE); Martin Lambert, Korb (DE)

(73) Assignee: TRUMPF Lasersystems for Semiconductor Manufacturing GmbH, Ditzingen (DE)

( * ) Notice: Subject to any disclaimer, the term of this patent is extended or adjusted under 35 U.S.C. 154(b) by 0 days.

(21) Appl. No.: 14/980,017

(22) Filed: Dec. 28, 2015

(65) Prior Publication Data
US 2016/0135275 A1    May 12, 2016

Related U.S. Application Data

(63) Continuation of application No. PCT/EP2014/063153, filed on Jun. 23, 2014.

(30) Foreign Application Priority Data

Jun. 28, 2013 (DE) .................. 10 2013 212 685

(51) Int. Cl.
*H05G 2/00* (2006.01)
*H01S 3/00* (2006.01)

(52) U.S. Cl.
CPC .......... *H05G 2/008* (2013.01); *H01S 3/0071* (2013.01); *H01S 3/005* (2013.01)

(58) Field of Classification Search
CPC combination set(s) only.
See application file for complete search history.

(56) References Cited

U.S. PATENT DOCUMENTS

| 7,102,806 B2 | 9/2006 | Boettcher |
| 7,298,484 B2 | 11/2007 | Chen et al. |

(Continued)

FOREIGN PATENT DOCUMENTS

| DE | 8236963 A1 | 4/1983 |
| DE | 602005002630 T2 | 6/2008 |

(Continued)

OTHER PUBLICATIONS

International Search Report for corresponding PCT Application No. PCT/EP2014/063153, mailed Oct. 9, 2014, 4 pages.

(Continued)

*Primary Examiner* — Phillip A Johnston
*Assistant Examiner* — Hsien Tsai
(74) *Attorney, Agent, or Firm* — Fish & Richardson P.C.

(57) ABSTRACT

An extreme ultraviolet radiation generating device includes a source operable to generate a first and second entrance beam, and a beam unit operable to modify at least one of a direction and a beam divergence of the first and second entrance beam, in which the beam unit includes: a beam splitter to receive the first and second entrance beam, the beam splitter being configured to reflect the first entrance beam as a first exit beam and to transmit the second entrance beam; and a mirror in the beam path of the transmitted, second entrance beam to reflect the second entrance beam to form a second exit beam that is transmitted by the beam splitter and that is at least partially superposed on the first exit beam, in which the beam unit is configured to modify an angle and/or beam divergence between the first and second exit beam.

13 Claims, 3 Drawing Sheets

(56) References Cited

U.S. PATENT DOCUMENTS

| | | | |
|---|---|---|---|
| 7,858,901 B2 | 12/2010 | Krishnan et al. | |
| 8,049,133 B2 | 11/2011 | Oba et al. | |
| 2005/0002078 A1* | 1/2005 | Boettcher | G02B 26/0825 |
| | | | 359/224.1 |
| 2005/0200847 A1* | 9/2005 | Chen | G02B 23/12 |
| | | | 356/419 |
| 2011/0141865 A1* | 6/2011 | Senekerimyan | H05G 2/008 |
| | | | 369/47.15 |
| 2013/0169894 A1* | 7/2013 | Ouderkirk | G02B 27/1033 |
| | | | 349/9 |

FOREIGN PATENT DOCUMENTS

| | | |
|---|---|---|
| DE | 102008025381 A1 | 12/2008 |
| DE | 602004012999 T2 | 5/2009 |
| EP | 1424584 B1 | 2/2007 |
| JP | 2009105006 A | 5/2009 |
| WO | WO2007146329 A2 | 12/2007 |
| WO | WO2012052985 A1 | 4/2012 |

OTHER PUBLICATIONS

Notification Concerning Transmittal of International Preliminary Report on Patentability and Written Opinion of the International Searching Authority from corresponding PCT Application No. PCT/EP2014/063153, mailed Jan. 7, 2016, 16 pages.

\* cited by examiner

EUV RADIATION GENERATING DEVICE INCLUDING A BEAM INFLUENCING OPTICAL UNIT

CROSS-REFERENCE TO RELATED APPLICATIONS

This application is a continuation of and claims priority under 35 U.S.C. §120 to PCT Application No. PCT/EP2014/063153 filed on Jun. 23, 2014, which claimed priority to German Application No. DE 10 2013 212 685.9, filed on Jun. 28, 2013. The contents of both of these priority applications are hereby incorporated by reference in their entirety.

TECHNICAL FIELD

The present disclosure relates to an extreme ultraviolet (EUV) radiation generating device having a beam influencing optical unit.

BACKGROUND

Optical units for influencing two or more beams, such as two or more laser beams, are used in various technological areas such as, for example EUV radiation generating devices.

SUMMARY

In general, according to one or more aspects, the subject matter of the present disclosure can be embodied in an EUV radiation generating device having a beam influencing optical unit with which it is possible to efficiently influence beams, in particular laser beams, with respect to their beam direction and/or their beam divergence. The EUV radiation generating unit can include at least one radiation source for generating a first and second entrance beam that is at least partially superposed on the first entrance beam and that can extend in particular substantially collinearly with the first entrance beam. The beam influencing optical unit can modify the first entrance beam and the second entrance beam with respect to beam direction and/or beam divergence.

Implementations of the EUV radiation generating device can include one or more of the following features. For example, in some implementations, the EUV radiation generating device includes: a beam splitter that is configured to reflect the first entrance beam as a first exit beam and to transmit the second entrance beam; and a mirror element that is arranged in the beam path of the transmitted, second entrance beam and that reflects the second entrance beam back to the beam splitter so as to form a second exit beam that is transmitted by the beam splitter and at least partially superposed on the first exit beam. The beam influencing optical unit can be configured to modify an angle between the first and the second exit beams and/or to modify a beam divergence of the first and/or of the second exit beam.

The EUV radiation generating device is operable to modify the beam direction and/or the beam divergence of two partially superposed, in particular (approximately) collinear beams that enter the EUV radiation generating device using two optical elements, such as the beam splitter and the mirror element. A partial superposition of beams within the context of this disclosure is understood to mean that their beam paths partially intersect or that the beams partially overlap. The first and second entrance beams can be beams that are generated by one or more radiation sources. The first and second entrance beams are not required to pass through the beam influencing optical unit at the same time; instead, it is possible for the first and second entrance beams to pass through the beam influencing optical unit with a time offset, such as in the case of pulsed beams. The entrance beams can be two radiation components of the same beam, of which one component is reflected by the beam splitter and the other component is transmitted by the beam splitter. The first and second entrance beams can be mutually collinear. Irrespective of whether one radiation source or a plurality of radiation sources generate the first and second entrance beams, the beam splitter splits the two entrance beams, based on at least one optical property in which the two entrance beams differ, into a first radiation component that is reflected as the first exit beam and a second radiation component that is transmitted to the mirror element.

To modify the relative beam directions of the first and second exit beams, the beam splitter and/or the mirror element of the beam influencing optical unit can be arranged in different relative positions and/or relative alignments. This allows not only the alignment of the two exit beams at a (typically variable) angle with respect to one another, but also a parallel or collinear progression of the first and second exit beams with respect to one another. The first and second entrance beams can be collimated when they strike the beam splitter, although this is not required. To modify the beam divergence of the first and/or of the second exit beam, e.g., to generate a divergent or focused exit beam from a collimated entrance beam, the beam splitter and/or the mirror element can be configured to be deformable.

In the context of the present disclosure, modifying a beam direction is understood to include changing a quantity associated with the beam (e.g., the alignment of a first exit beam relative to another exit beam or a beam divergence of an exit beam) using the beam shaping optical unit. The change can be obtained using actuators, but it is also possible that the beam shaping optical unit permits a manual or, if appropriate, a predetermined change of the quantity (relative alignment or divergence) of the beam.

The mirror element can, in some implementations, reflect the second beam component completely or nearly completely to the beam splitter, e.g., the mirror element can have a highly reflective configuration. However, the mirror element can also be configured to be partially reflective or partially transmissive. In some implementations, the radiation component transmitted by the mirror element can be used, for example, for a beam measurement. The second exit beam is generally at least partially superposed on the first exit beam, e.g., the beam path or the beam paths of the exit beams at least partially overlap, such that the dimensions of the optical surfaces of optical elements that are arranged in the downstream beam path of the two exit beams can be kept as small as possible. To achieve this, the beam splitter and the mirror element are typically arranged with a small distance with respect one another, in which the small distance is generally less than twice the beam diameter of an entrance beam or is less than the sum of the beam diameters of the entrance beams.

In some implementations, the beam splitter and/or the mirror element are tiltable so that the angle between the first and second exit beams can be modified. The beam splitter and/or the mirror element can be tiltable using actuators. Since the beam splitter and/or the mirror element are tiltable, there exists, in some implementations, particularly effective configurations for modifying the beam directions of the two exit beams. It is possible, for example, to arrange the beam splitter in a spatially fixed manner in the beam influencing optical unit and for the mirror element to be tiltable relative to the beam splitter. Alternatively or additionally, it is possible for the beam splitter to be arranged to be tiltable in the beam influencing optical unit. Here, both elements (beam splitter and mirror element) can be mounted within the beam influencing optical unit (for example, at a main structure of the beam influencing optical unit) such that they are tiltable about one or more tilt axes, in which the tilt axes can be arranged, for example, such that each axis passes either through a corresponding element (for example, through the center of the corresponding element) or is offset with respect to the corresponding element (for example, outside the corresponding element).

Actuators can be used to tilt the elements. In some implementations, the actuators can be controlled precisely and quickly such as, for example, servomotors or piezomotors having relatively short displacement paths. Alternatively or additionally, it is possible to manually tilt at least one of the two elements to modify the beam directions of the first and/or second exit beams relative to one another. In some implementations, the element can be tilted and fixed in a respective angular position.

In some implementations, the mirror element is configured such that it is deformable in order to modify the beam divergence of the second exit beam. For example, the mirror can be deformed using an actuator. The deformation of the mirror element allows, in some implementations, the beam divergence of the second exit beam to be modified without changing the beam divergence of the first exit beam. During the deformation of the mirror element, the optically active surface of the mirror element (e.g., the surface form of the mirror surface) is changed such that the beam divergence of the second exit beam varies. If the mirror surface of the mirror element curves, for example, convexly to the outside, the divergence of the reflected beam increases. If, on the other hand, the curvature is reduced, in particular in a concave manner, the divergence of the beam can decrease as well.

The deformable mirror element can be configured as a mirror that has a membrane carrier and a mirror plate membrane attached thereto. Pressure, which can be supplied, for example, from a fluid, can be applied to the mirror plate membrane on its interior membrane rear side. Under the influence of the pressure, the mirror plate membrane curves to a greater or lesser extent or changes its geometric shape. Alternatively, it is also possible for an actuator, which is arranged on the rear side of the mirror element, to be provided to deform the mirror element, such as to deform the mirror surface. For example, the actuator can include an electromechanical servomotor or a piezoelectric element or multiple piezo elements. Actuators that can be controlled precisely and quickly can be used to permit quick and precise adjustment of different mirror surface geometries. Such actuators can engage centrically on the rear side of the mirror surface.

In some implementations, the beam splitter is configured to be plate-shaped or plate-type, e.g., the beam splitter has a first optical surface on the entrance side and, opposite to the entrance side (facing the mirror element), a second optical surface. The two optical surfaces on the opposite sides of the beam splitter do not necessarily have to be parallel to one another. For example, they can also be arranged at a non-parallel angle (for example, an acute angle), such that the plate-type beam splitter has a wedge shape. The optical surfaces can be configured to be planar or have a curvature. The use of a plate-shaped beam splitter not only permits a compact construction of the beam influencing optical unit, but also an at least partial superposition of the exit beams, without the use of additional optical elements.

In some implementations, the beam splitter is configured as a wavelength-selective element, e.g., the two entrance beams are either reflected or transmitted based on their wavelengths. For example, radiation having a wavelength of less than a specific wavelength limit can be reflected by the beam splitter directly as a first exit beam, whereas radiation having a wavelength that is greater than the wavelength limit can be transmitted by the beam splitter and, after reflection at the mirror element, be transmitted in turn by the beam splitter so as to form the second exit beam. The beam splitter can have a wavelength-selective coating on the optical surface on the entrance side for wavelength selection.

In some implementations, the beam splitter is configured as an etalon. In this case, radiation transmitted by the beam splitter is restricted to a defined wavelength or a defined (e.g., narrow) wavelength range. The first entrance beam is reflected at the etalon as a first exit beam. The effect of an etalon is based on the basic principle of the Fabry-Perot interferometer, in which typically two mutually parallel planar mirror surfaces arranged with a small distance (for example, on the order of magnitude of micrometers) are used to form a cavity. Such an etalon is restricted to transmitting radiation at a wavelength or a narrow wavelength range that meets the resonance condition. A substrate having, on a first and a second side surface, a (e.g., partially) reflective coating, such as a thin plane-parallel plate, can be used as an etalon. At one side surface, the coating can be, for example, in the form of a stack of alternating high-refractive and low-refractive quarter-wave layers. The coating can be mounted on a substrate that is made non-reflective on the rear side and having a thickness that corresponds to, for example, a multiple of a half-wave layer. A coating applied on the other side surface can have another stack of alternating high-refractive and low-refractive quarter-wave layers. The terms "half-wave" or "quarter-wave" layers here relate to the optical thickness of the layers, which corresponds to half or a quarter of the central (resonant) wavelength of the etalon. It is also possible to use other types of etalons such as, for example, etalons referred to as air-spaced etalons, in which two thin flats are kept at a specified distance with respect to one another by spacers. It is furthermore possible to configure the distance of the flats with respect to one another such that the distance is adjustable for setting the resonance condition (e.g., to set the wavelength or the wavelength range that is transmitted by the etalon). The first entrance beam is reflected by the etalon, and the second entrance beam is transmitted and reflected at the mirror element.

In some implementations, the beam splitter is configured as a polarizing beam splitter. The beam splitter can split the incoming radiation (the first and second entrance beams) based on their polarization properties. As an example, radiation having a first polarization direction can be reflected by the beam splitter directly as the first exit beam, whereas radiation having a second polarization direction that is typically perpendicular to the first polarization direction is transmitted by the beam splitter. The entrance beam having the first polarization direction and the entrance beam having the second polarization direction can be two perpendicularly polarized components of the same beam that enters the beam influencing optical unit. The beam can be generated by one radiation source and can be polarized, for example, elliptically, circularly or linearly. In the case of a linearly polarized beam, the polarization direction typically may not extend in the plane of incidence or perpendicular to the plane of incidence since otherwise the incoming radiation is either only reflected or only transmitted.

In some implementations, an optical surface on the beam entrance side of the beam splitter and/or a side of the beam splitter facing the mirror element have a curvature for producing a predetermined divergence of the first and second exit beams. Thus, in some implementations, it is advantageously possible to change the first exit beam in terms of its divergence. Due to the optical surface curvature of the entrance side and/or of the side facing the mirror element (e.g., a convex curvature), the beam divergence of the first exit beam can be influenced such that it takes a specific (e.g., increased) value. It is also possible to configure the curvature of the optical surfaces (the entrance side and/or the side facing the mirror element) such that they are adjustable (e.g., deformable), as described herein, with respect to the mirror element. In such implementations, the beam divergences of both the first and the second exit beam can be varied independently of the mirror element.

In some implementations, an entrance side optical surface of the beam splitter and a side of the beam splitter facing the mirror element are aligned at an angle with respect to one another to produce a predetermined angular offset between the first and second exit beams. The beam influencing optical unit according to those implementations can be used, for example, if the tiltability of the mirror element and/or of the beam splitter is limited due to limited available space. For example, the optical surfaces on the entrance side of the beam splitter and on the side of the beam splitter facing the mirror element can extend at an acute angle that allows an angular offset between the optical surfaces to be produced, even if beam splitter and mirror element are aligned parallel to each other. The first entrance beam can be reflected without change as the first exit beam at the entrance side optical surface of the beam splitter. Due to the angular offset between the optical surfaces of the beam splitter, the second entrance beam can be deflected such that the beam direction of the second exit beam changes with respect to the beam direction of the first exit beam. The angle between the two surfaces can be matched to the corresponding installation space situation.

In some implementations, the beam influencing optical unit further includes a focusing element for focusing the first exit beam at a first focal point and the second exit beam at a second focal point. The beam splitter and the mirror element can be used to align both exit beams with the same focusing element and to focus them at the first and second focal points. The first and second exit beams, or their first and second focal points, can be focused in a targeted fashion in a first and second predetermined focus position, depending on the intended application. The first and second predetermined focus positions can also coincide, if appropriate. Reflective focusing elements (for example, parabolic mirrors) but also transmissive optical elements (for example, lenses) can be used for focusing. The beam splitter, the mirror element and the focusing element or elements can be affixed or mounted in each case at a main structure of the beam influencing optical unit. Tiltable elements, such as, for example, the beam splitter and/or the mirror element, can be mounted at the main structure such that they are generally driven by motor or are manually tiltable.

In some implementations, the focusing element includes a focusing lens. A focusing lens can be used to effectively focus the two impinging exit beams that are partially superposed on one another in particular if they strike the lens approximately in the center. Focusing lenses that can be used include, for example, (bi)convex quartz lenses, and other materials, such as, for example, zinc selenide. Selection of the lens material can depend on the wavelength of the radiation used.

In some implementations, the beam splitter and/or the mirror element are displaceable in a translational manner using, for example, actuators. Due to the translational displaceability, the relative arrangement, such as the distance of the respective optical surfaces of the mirror element and of the beam splitter, can be adjusted. In this way, the two exit beams can be aligned in the direction of the focusing element, which, in some implementations, simplifies modifying the location of a respective focal point. The translational displaceability can also be used to modify the angle between the first and second exit beams, such as when the beam splitter and/or the mirror element have a curvature. By appropriate selection of the distance between the beam splitter and the mirror element, it is possible, in some implementations, to ensure that the focusing element is struck substantially in the center when there is a change in the beam direction and/or divergence of the entrance beams. In an example, it is possible to compensate for a change in the beam direction or the beam location of the second exit beam along an axis that is perpendicular to the beam direction of the first exit beam in the deflection plane of entrance beam and second exit beam. In order to obtain that compensation, the second exit beam in the basic position (e.g., with unchanged distance between beam splitter and mirror element) preferably has a greater distance from the entrance beams than the first exit beam. The beam splitter and/or the mirror element are, in some implementations, mounted at the main structure of the beam influencing optical unit so as to be not only tiltable but also displaceable by translation. At least one actuator can be provided to displace the beam splitter and/or the mirror element.

In some implementations, the beam influencing optical unit can include a control apparatus for controlling actuators that tilt and/or deform and/or displace the beam splitter and/or the mirror element. Due to the individual controlling of the actuators, it is possible for the first and second focal points to assume a predetermined (prespecified) position in three-dimensional space or to follow a predetermined movement path in three-dimensional space, e.g., the focus positions can be adjusted in all three spatial dimensions (X direction, Y direction and Z direction). Optical elements that are located in the beam path of the two exit beams, such as, for example, the focusing element, preferably continue to be illuminated centrally by both exit beams. By changing the distance between the beam splitter and the mirror element, continuous illumination is possible even in the case of a change in the beam direction of the second exit beam, if the change of the beam position of the second exit beam takes place along an axis that is perpendicular to the beam direction of the first exit beam and is located in the deflection plane of entrance beam and second exit beam. As discussed herein, it is preferable that the second exit beam in the basic position (e.g., with unchanged distance between beam splitter and mirror element) has a greater distance from the entrance beam than the first exit beam. The distance between beam splitter and mirror element in the basic position can be selected such that the two exit beams strike the focusing element substantially in the center. If the beam direction and/or divergence of the entrance beams changes, the actuators can be controlled such that the exit beams strike the focusing element approximately in the center.

The beam shaping optical unit can also be used, for example, when controlling the actuators individually, in an EUV beam generating apparatus for generating EUV radiation, in which a laser beam is guided by a driver laser apparatus in the direction of a target position. The beam influencing optical unit can be integrated in the beam path between the driver laser apparatus and the target position, such as, for example, in a beam guidance apparatus or another optical apparatus.

In some implementations, in the EUV beam generating device, the laser beam is guided by the driver laser apparatus by an element that focuses the laser beam at the target position. A (e.g., movable) target is provided at the target position. The target then is excited when irradiated with the laser beam, and transitions into a plasma state so that the target emits EUV radiation. Driver lasers, e.g., in the form of $CO_2$ lasers, which permit a high conversion efficiency between the input power of the driver laser and the output power of the EUV radiation can be used as driver laser apparatuses. The target materials can include, for example, tin.

In some implementations, the EUV radiation generating apparatus has a beam shaping system that includes a beam influencing optical unit and one or two radiation sources for generating the first and second entrance beams. The first and the second entrance beam, which are approximately collinear and, in some implementations, collimated, can be generated, for example, by a single radiation source at the same time and/or be amplified in additional amplifier stages suitable for amplifying a laser beam. In some implementations, the beam that is incident on the beam influencing optical unit is first split at the beam splitter into two entrance beams that differ in terms of at least one of their properties (for example, in terms of wavelength and/or polarization direction). The beam splitter can be configured such that the intensity of the radiation components of the two entrance beams has a desired ratio. In some implementations, the beam influencing optical unit can be used to modify the beam direction and/or the beam divergence of two entrance beams to strike a movable target with both exit beams with targeted accuracy at two predetermined positions.

The first and second entrance beams can also be generated by two radiation sources independently of one another at the same time or with a time offset. In both cases, the first entrance beam exits the beam shaping system as the first exit beam and the second entrance beam exits as the second exit beam. The radiation generation by the one or more radiation sources can be pulsed or continuous. It is possible, for example, for the entrance beams generated by the same or different radiation sources to strike the beam influencing optical unit in quick succession.

In some implementations, the EUV radiation generating device includes an adjustment apparatus for adjusting the first focal point to a first predetermined focus location and the second focal point to a second predetermined focus location, in which the first and second predetermined focus locations can also coincide. This adjustment can, in some implementations, be advantageous if disturbances that are associated with the radiation source or sources occur, where the disturbances lead to a change in the focus location. For example, it is possible for disturbances in the form of fluctuations in the direction or divergence of entrance beams (such as drift) to be "adjusted out" or suppressed by the adjustment apparatus such that the two exit beams or the two focal points remain in their respective predetermined position or predetermined location by the re-adjustment.

Further advantages can be gathered from the description and the drawing. It is likewise possible for the previously mentioned features and the features still to be mentioned to be used by themselves or for several of them to be used in desired combinations. The embodiments that are illustrated and described are not to be understood as a limiting enumeration, but rather have exemplary character for the explanation of the invention.

DETAILED DESCRIPTION

In the description of the drawings that follows, identical reference signs are used for identical or functionally identical components. No beam refraction at the respective surfaces has been shown.

Figures 1, 2, 3:
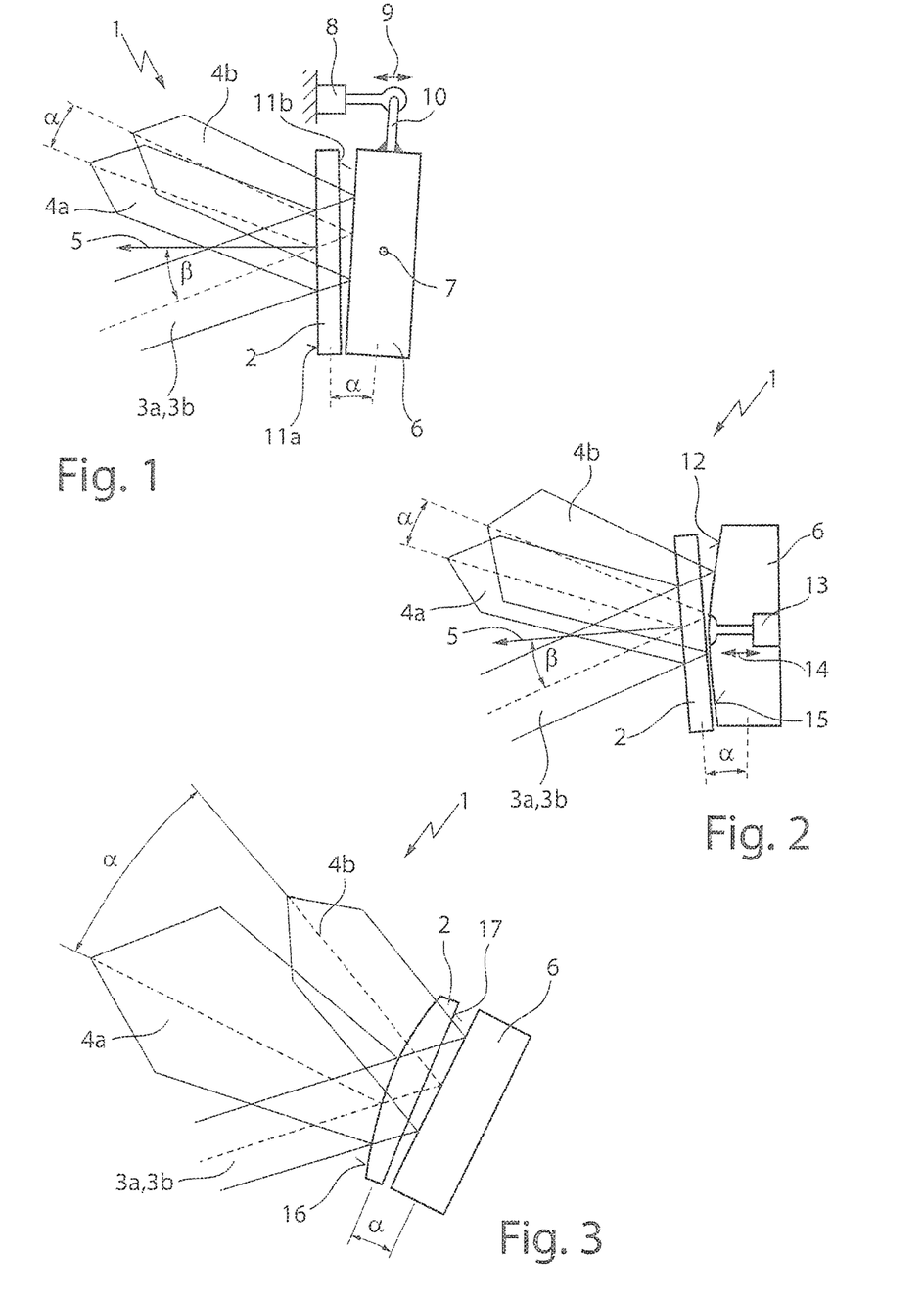
FIG. 1 is a schematic that illustrates a first beam influencing optical unit having a beam splitter and a mirror element.
FIG. 2 is a schematic that illustrates a second beam influencing optical unit having a deformable mirror element.
FIG. 3 is a schematic that illustrates a third beam influencing optical unit, in which the beam splitter has on the entrance side a curved optical surface.

FIG. 1 is a schematic that illustrates a beam influencing optical unit 1 having a beam splitter 2 that is configured to reflect a first entrance beam 3a as a first exit beam 4a and to transmit a second collimated entrance beam 3b that is collinear with the first entrance beam 3a. The beam splitter 2 has a plate-shape, e.g., it has a relatively low thickness of typically less than approximately half its aperture. The collinear entrance beams 3a, 3b are incident at an angle β with respect to the normal direction 5 of the beam splitter 2. The beam influencing optical unit 1 also has a mirror element 6 that is arranged in the beam path of the transmitted, second entrance beam 3b and is configured or arranged such that the second entrance beam 3b is reflected back to the beam splitter 2 to form a second exit beam 4b that is transmitted by the beam splitter 2. Although FIG. 1 shows the first and second entrance beams 3a, 3b striking the beam splitter 2 and intersecting completely, in actual practice, the first and second entrance beams 3a, 3b strike the beam splitter 2 in partially superposed fashion, e.g., their beam paths intersect only partially.

The mirror element 6 is arranged in the beam influencing optical unit 1 such that it is tiltable about a tilt axis 7. The second exit beam 4b extends at an angle α with respect to the first exit beam 4a that is adjustable based on the alignment of the mirror element 6. Alternatively or additionally, the beam splitter 2 can be arranged in the beam influencing optical unit 1 such that it is tiltable about a corresponding tilt axis (not illustrated). In this way, two collinear entrance beams 3a, 3b can be influenced by the beam influencing optical unit 1 simply and effectively such that the relative beam direction or the angle α between the corresponding exit beams 4a, 4b is adjustable in a targeted fashion. If appropriate, the alignment of the exiting laser beams 4a, 4b does not have to be adjustable. In this case, the beam splitter 2 and the mirror element 6 are arranged in a fixed fashion and are aligned so they are non-parallel.

In order to tilt the mirror element 6 (or to tilt the beam splitter 2), an actuator 8 is provided, that allows the alignment or orientation of the mirror element 6 to be modified. As shown in FIG. 1, the actuator 8 is configured as a linear actuator acting in a movement direction 9. The linear actuator tilts the mirror element 6, via a lever mechanism 10, about the tilt axis 7 and thus changes the exit direction of the second exit beam 4b relative to the first exit beam 4a. As shown in FIG. 1, the second exit beam 4b is at least partially superposed on the first exit beam 4a. The purpose of this at least partial superposition is so that the optical units that are arranged in the further beam path of the two exit beams 4a, 4b can have a relatively small optical surface. However, a beam path of the two exit beams 4a, 4b without mutual superposition is also possible by way of a corresponding relative arrangement of the mirror element 6 with respect to the beam splitter 2.

The beam splitter 2 is configured in the example shown in FIG. 1 as a wavelength-selective element that either reflects or transmits the two entrance beams 3a, 3b based on their wavelengths. A front side 11a of the beam splitter 2 can have, e.g., a wavelength-selective, typically dielectric, coating. Alternatively, or in addition, the beam splitter 2 can be configured as an etalon that only lets radiation that meets a specified resonance condition and that corresponds to a defined wavelength or a defined wavelength range pass through the beam splitter 2 as the second exit beam 4b. In the case the beam splitter is an etalon, both the entrance side optical surface 11a and the mirror element side optical surface 11b can have a partially reflective coating that is applied onto a substrate. Alternatively, the beam splitter 2 can be configured as a two-part etalon, e.g., the beam splitter 2 is assembled from two plates 11a, 11b, between which a thin gap is formed.

FIG. 2 illustrates another example of a beam influencing optical unit 1 for influencing the first entrance beam 3a and the second entrance beam 3b, in which the second entrance beam 3b is collinear with the first entrance beam 3a. In contrast to FIG. 1, the mirror element 6 is not only tiltable about the tilt axis 7, but is also configured to be deformable for producing a varying beam divergence of the first and second exit beams 4a, 4b; more specifically, the curvature of a mirror surface 12 of the mirror element 6 is adjustable. If the mirror element 6 is deformed, the optically effective surface 12 of the mirror element 6 changes, and thus the beam divergence of the second exit beam 4b that is reflected by the optical surface 12 also changes. If the mirror surface 12 of the mirror element 6 is curved convexly toward the outside, the divergence of the reflected, second exit beam 4b increases. If the curvature is reduced, the divergence of the second exit beam 4b also decreases. It is possible with a corresponding curvature of the mirror surface 12 to also focus the second exit beam 4b.

To produce a curvature of the mirror surface 12 that is more or less strongly pronounced, a controllable actuator 13 is provided in the interior of the mirror element 6 in the example shown in FIG. 2. The actuator 13 can be configured, for example, as a linear actuator acting in a movement direction 14, in which the actuator 13 centrally engages the rear side 15 of the mirror surface 12 and thus causes the mirror surface 12 to curve to varying extents. Adjustable deformation or influencing of the curvature of the surface 12 of the mirror element 6 is also possible in other ways. For example, fluid pressure can be applied to the surface 12 of the mirror element on the rear side 15, in which the surface 12 is configured as a membrane, as described, for example, in EP 1 424 584 A1.

Not only can the beam influencing optical unit 1 of FIG. 2 cause the relative direction of the exit beams 4a, 4b to differ by modifying the collinear entrance beams 3a, 3b (e.g., the second exit beam 4b proceeds at an angle α with respect to the first exit beam 4a), but the beam influencing optical unit 1 also can cause the beam divergence of the first and second exit beams 4a, 4b to differ. This is can be an advantage, in some implementations, such as when the exit beams 4a, 4b are focused, since the change in beam divergence provides another degree of freedom in fixing of the focus position.

The beam splitter 2 is configured in FIG. 2 in an exemplary manner as a polarization beam splitter. That is, the two entrance beams 3a, 3b are reflected or transmitted based on their polarization direction. For example, a polarization-selective coating can be applied on the front side of the beam splitter 2, in which the coating permits transmission or reflection of the entrance beams 3a, 3b based on the polarization direction. The first entrance beam 3a having a first polarization direction and the second entrance beam 3b having a second polarization direction that is perpendicular to the first one can be two perpendicularly polarized radiation components of the same beam that is generated by a radiation source such as, for example a laser source, and that enters the beam influencing optical unit 1. In this case, the entering beam is split at the beam splitter 2 into the two entrance beams 3a, 3b. The beam splitter 2 in FIG. 2 can alternatively be configured as a wavelength-selective beam splitter 2 according to FIG. 1. Similarly, the beam splitter 2 in FIG. 1 can alternatively be configured as a polarization beam splitter.

FIG. 3 is a schematic that illustrates another example of a beam influencing optical unit 1. As shown in FIG. 3 the beam splitter 2 and mirror element 6, which are arranged to generate an exit angle α between the first and second exit beams 4a, 4b, are tilted relative to one another (i.e., not parallel). In contrast to the beam influencing optical units 1 of FIG. 1 and FIG. 2, the beam splitter 2 in FIG. 3 is configured to produce a predetermined beam divergence of the first exit beam 4a. To this end, the entrance side optical surface 16 of the beam splitter 2, where, for example, a wavelength-selective coating may be provided, has a specified convex curvature. Due to the convex curvature of the optical surface 16, the beam divergence of the first exit beam 4a is increased. Alternatively or additionally, a mirror element side optical surface 17 of the beam splitter 2 can have a curved configuration to modify the beam divergence of the second exit beam 4b. The curvatures of the optical surfaces 16, 17 can be identical or different. By fixing the curvatures of the optical surfaces 16, 17, it is possible to set the beam divergence of exit beams 4a, 4b to a fixed value independently of the curvature of the mirror element 6.

Figure 4:
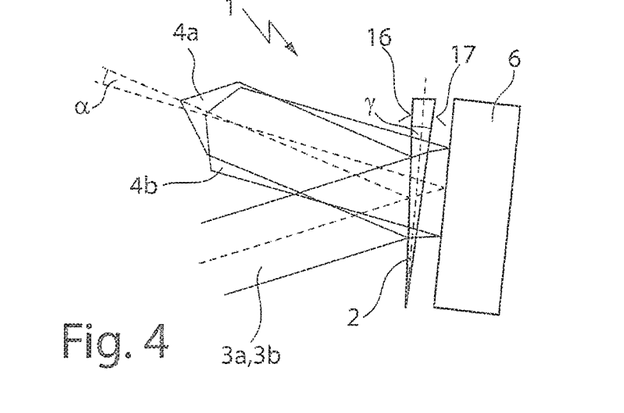
FIG. 4 is a schematic that illustrates a fourth beam influencing optical unit having a plate-type, wedge-shaped beam splitter.

FIG. 4 is a schematic that illustrates another example of a beam influencing optical unit 1, in which an entrance side optical surface 16 and a mirror element side optical surface 17 of the beam splitter 2 are aligned with one another at an angle γ (the angle γ in FIG. 4 is approximately 10°, though larger angles are also possible) to produce a predetermined angular offset, i.e., a predetermined angle α, between the first and second exit beams 4a, 4b. Once the second exit beam 4b has passed through the plate, wedge-shaped beam splitter 2, the second exit beam 4b is tilted relative to the first exit beam 4a such that the two exit beams 4a, 4b have a specified angle α with respect to one another, even if the beam splitter 2 (more precisely, the central plane thereof) and the mirror element 6 are aligned parallel with respect to one another. The angle α between the two exit beams 4a, 4b can additionally be changed by tilting of beam splitter 2 and mirror element 6, as shown, for example, in FIG. 1 to FIG. 3.

Figure 5:
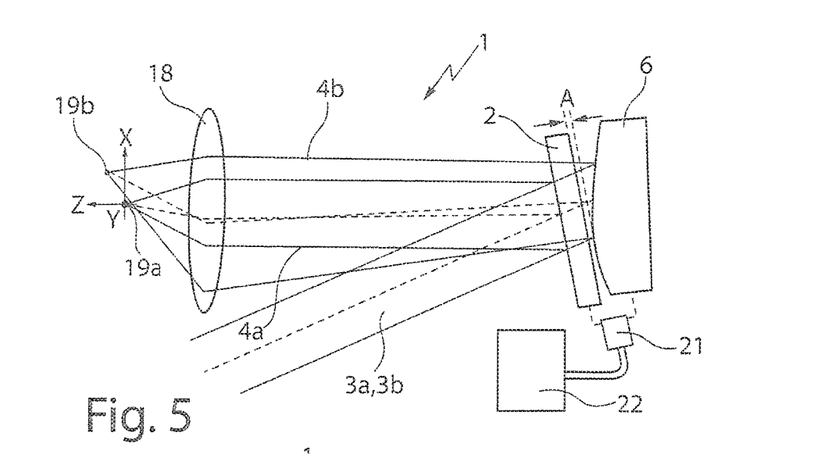
FIG. 5 is a schematic that illustrates a beam influencing optical unit having a focusing lens.
Figure 6:
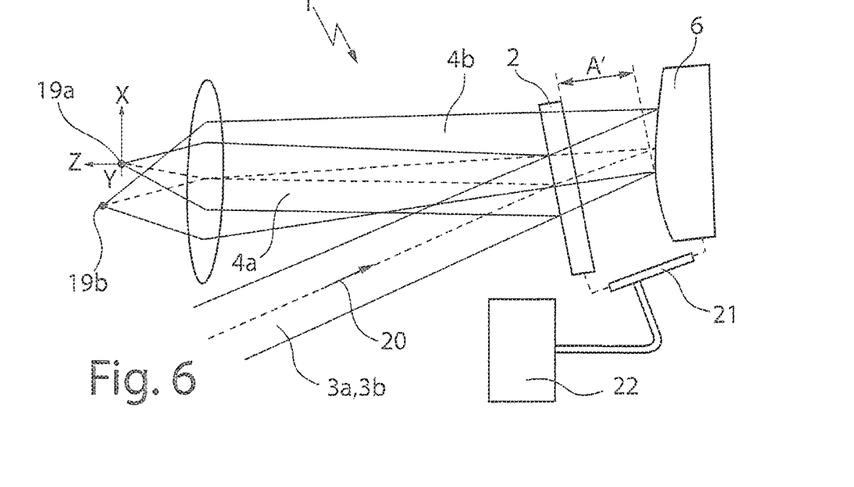
FIG. 6 is a schematic that illustrates the beam influencing optical unit of FIG. 5 having a mirror element that has been moved to a different position.

FIG. 5 and FIG. 6 are schematics that illustrate an example of a beam influencing optical unit 1, which includes, in addition to the beam splitter 2 and the mirror element 6, a focusing element 18 configured as a focusing lens for focusing the first exit beam 4a to a first focal point 19a and the second exit beam 4b to a second focal point 19b. The first and second exit beams 4a, 4b are partially superposed on one another and can therefore be directed, by the beam splitter 2 and the mirror element 6, onto the same focusing element 18. From the focusing element 18, the first exit beam 4a is focused to a first (predetermined) focal point 19a and the second exit beam is focused to a second (predetermined) focal point 19b. The beam splitter 2, the mirror element 6 and the focusing element 18 are mounted at a main structure (not illustrated) of the beam influencing optical unit 1.

In FIG. 5 and FIG. 6, the mirror element 6 is configured to be displaceable in translational fashion. For illustrative purposes, in FIG. 6 the distance A' between the beam splitter 2 and the mirror element 6 was increased, by way of example, relative to the distance A shown in FIG. 5 by translational displacement of the mirror element 6 in a direction that is parallel to the incident direction 20 of the entrance beams 3a, 3b. Due to the translational displacement, it is possible to readjust the distance A, A' between the beam splitter 2 and the mirror element 6 such that the two exit beams 4a, 4b can be aligned approximately centrally with the focusing element 18, even in the case of a drift of the beam direction. If the beam splitter 2 is not tilted, as is illustrated in FIG. 5 and FIG. 6, the first focal point 19a remains in the origin of the X, Y, Z coordinate system (with the X axis parallel to the optical axis of the focusing element 18), whereas in FIG. 5, the second focal point 19b is located at positive X coordinates and in FIG. 6 at negative X coordinates.

Alternatively or additionally, the beam splitter 2 can be displaceable in translational fashion. For the purposes of translational displacement, a controllable actuator 21 that is configured as a linear actuator is provided, as shown in in FIG. 5 and FIG. 6. The beam influencing optical unit 1 includes a control apparatus 22 configured to control the actuators 8, 13, 21, which tilt, deform and/or displace the beam splitter 2 and/or the mirror element 6. The actuators 21 are connected to the control apparatus 22 to allow signal exchanges for the purpose of control. Similar connections for signal exchanges to the tilting and/or deforming actuators 8, 13, as shown in FIG. 1 and FIG. 2, are also provided, although they are not illustrated in FIG. 1 and FIG. 2 for the purposes of clarity. The control apparatus 22 allows the actuators 8, 13, 21 to be individually controlled so that the first and second focal points 19a, 19b in each case can be set to a desired (predetermined) location in the three-dimensional space. For example, the individual control of the actuators 8, 13, 21 allows the location of the two focal points 19a, 19b to be set relative to one another in three spatial dimensions (X, Y, Z).

The location of the focal points 19a, 19b in the direction of the Y axis can be modified by tilting the beam splitter 2 or the mirror element 6 about a tilt axis that is located in the plane of the drawing (not illustrated). By changing the distance A, A' between the beam splitter 2 and the mirror element 6 to illuminate the focusing element 18 approximately centrally, it is possible to compensate for the change in the beam location only along the X axis, provided that the second exit beam 4b is in a basic position (e.g., with unchanged distance A between beam splitter 2 and mirror element 6 (see FIG. 5)) has a larger distance from the entrance beams 3a, 3b than the first exit beam 4a. The X axis is located perpendicular to the beam direction of the first exit beam 4a (and typically parallel to the optical axis of the focusing element 18) in the deflection plane of the entrance beams 3a, 3b and the second exit beam 4b. The ability to provide such compensation does not exist for a change of the beam direction along the Y axis. The focus location can be changed in the Z direction by changing the divergence.

Figure 7:
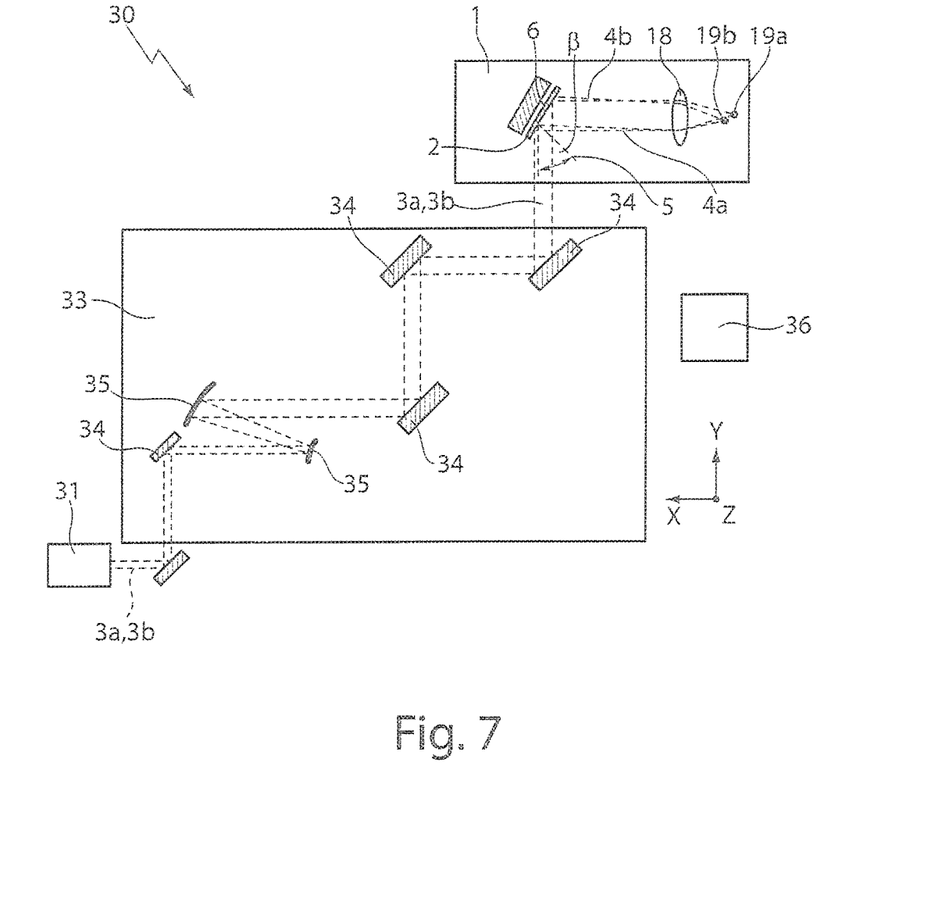
FIG. 7 is a schematic that illustrates an EUV radiation generating device having a beam influencing optical unit.

FIG. 7 is a schematic that illustrates a beam shaping system that is configured as an EUV radiation generating device 30. The beam shaping system 30 includes a radiation source, configured as a driver laser apparatus 31, for generating the first and second entrance beams 3a, 3b with different wavelengths. The beam shaping system 30 also includes a beam influencing optical unit 1 that is configured and arranged as in FIG. 5 and/or FIG. 6 for focusing the first and second exit beams 4a, 4b at a first and second focus position 19a, 19b. The beam shaping system 30 also includes a beam guidance apparatus 33 having multiple deflection mirrors 34 or parabolic mirrors 35. The beam shaping system 30 also includes one or more measurement apparatuses (not illustrated for purposes of clarity) for monitoring the beam path of the entrance beams 3a, 3b.

The driver laser apparatus 31 includes two $CO_2$ beam sources and multiple amplifiers for generating the two entrance beams 3a, 3b with a high radiation power (>1 kW) in pulsed form, in which the two different wavelengths are produced by a grating in the cavity of the respective beam sources. The entrance beams 3a, 3b are guided from the driver laser apparatus 31 first into the beam guidance apparatus 33 and then to the beam influencing optical unit 1, which is arranged in a vacuum chamber in the example shown in FIG. 7. The entrance beams 3a, 3b strike the beam splitter 2 at an angle β of approximately 45° with respect to the normal direction 5 of the beam splitter 2 of the beam influencing optical unit 1. After the relative beam direction and/or beam divergence of the two entrance beams 3a, 3b are modified by the beam influencing optical unit 1 as described herein, the beams 3a, 3b are directed to the focusing element 18. The focusing element 18 is configured as a focusing lens and focuses the two entrance beams 4a, 4b to the two focal points 19a, 19b.

For targeted focusing of the two exit beams 4a, 4b, the beam shaping system 30 also includes an adjustment apparatus 36 for adjusting the first focal point 19a to a first predetermined focus location and the second focal point 19b to a second predetermined focus location. For the adjustment, the beam path of the entrance beams 3a, 3b is measured by means of the measurement apparatuses described herein. For controlling the corresponding actuators, the adjustment apparatus 36 is connected to the beam influencing optical unit 1 and to the measurement apparatuses (not shown).

In the beam shaping system 30 shown in FIG. 7, the predetermined focus location corresponds to the position of a movable target in the form of a tin droplet, which moves along a specified path. It is possible, using the driver laser apparatus 31, to generate two laser pulses in quick succession which form the entrance beams 3a, 3b. To ensure that the entrance beams 3a, 3b, generated with the time offset, strike the moving target, they are focused at different spatial points or different predetermined focus locations 19a, 19b along the movement path of the target, as is indicated in FIG. 7. A tin droplet which serves as the target material is struck by both focused exit beams 4a, 4b and thus transitions into a plasma state which generates EUV radiation. The target material is supplied to the beam influencing optical unit 1 with the aid of a provision apparatus (not illustrated) that guides the target material along a specified path that intersects with the target position, more precisely the predetermined focus locations 19a, 19b.

In FIG. 7, the beam splitter 2 and the mirror element 6 of the beam influencing optical unit 1 are arranged in the beam path between the last deflection mirror 34 of the beam guidance apparatus 33 and the focusing element 18. The beam splitter 2 and the mirror element 6 can also be arranged at a different location. For example, the beam splitter 2 and the mirror element 6 can be arranged at the location of the last deflection mirror 34 of the beam guidance apparatus 30.

A number of embodiments have been described. Nevertheless, it will be understood that various modifications may be made without departing from the spirit and scope of the invention. Accordingly, other embodiments are within the scope of the following claims.

What is claimed is:

1. An extreme ultraviolet (EUV) radiation generating device comprising:
    a radiation source operable to generate a first entrance beam and a second entrance beam;
    a beam influencing optical unit operable to modify at least one of a direction and a beam divergence of the first entrance beam and of the second entrance beam, wherein the beam influencing optical unit comprises:
        a beam splitter arranged to receive the first entrance beam and the second entrance beam that is at least partially superposed on the first entrance beam, wherein the beam splitter is configured to reflect the first entrance beam as a first exit beam and to transmit the second entrance beam, and
        a mirror element arranged in the beam path of the transmitted, second entrance beam to reflect the second entrance beam back to the beam splitter so as to form a second exit beam that is transmitted by the beam splitter and that is at least partially superposed on the first exit beam,
    wherein the beam influencing optical unit is configured to modify an angle between the first exit beam and the second exit beam and/or to modify a beam divergence of the first exit beam and/or of the second exit beam; and
    a focusing element arranged and configured to focus the first exit beam and the second exit beam to a first focal point and to a second, different focal point, respectively, on a movement path along which a moving target travels during operation of the EUV radiation generating device.

2. The EUV radiation generating device of claim 1, wherein the beam splitter and/or the mirror element are tiltable, such that the angle between the first exit beam and the second exit beam varies upon tilting the beam splitter and/or the mirror element.

3. The EUV radiation generating device of claim 1, wherein the mirror element is operable to be deformed so that the beam divergence of the second exit beam varies in response to a deformation of the mirror element.

4. The EUV radiation generating device of claim 1, wherein the beam splitter comprises a shape of a plate.

5. The EUV radiation generating device of claim 1, wherein the beam splitter comprises a wavelength-selective optical element.

6. The EUV radiation generating device of claim 5, wherein the beam splitter comprises an etalon.

7. The EUV radiation generating device of claim 1, wherein the beam splitter comprises a polarizing beam splitter.

8. The EUV radiation generating device of claim 1, wherein a first surface of the beam splitter comprises a curvature configured to produce a divergence of the first exit beam and/or the second exit beam.

9. The EUV radiation generating device of claim 1, wherein a first side of the beam splitter, arranged to receive the first entrance beam and the second entrance beam, and a second opposite side of the beam splitter are aligned at a non-parallel angle with respect to one another.

10. The EUV radiation generating device of claim 1, wherein the focusing element comprises a focusing lens.

11. The EUV radiation generating device of claim 1, further comprising an actuator arranged to displace the beam splitter or the mirror element.

12. The EUV radiation generating device of claim 1, further comprising:
    an actuator arranged to tilt, deform and/or displace the mirror or the beam splitter; and
    a control apparatus operable to control the actuator.

13. The EUV radiation generating device of claim 1, further comprising:
    an adjustment apparatus operable to adjust the first focal point to a first predetermined focus location and the second focal point to a second predetermined focus location.

* * * * *